United States Patent
Toda et al.

(10) Patent No.: US 8,776,933 B2
(45) Date of Patent: Jul. 15, 2014

(54) VEHICLE BODY FRAME FOR MOTORCYCLE, AND MOTORCYCLE INCORPORATING THE SAME

(75) Inventors: Munehiro Toda, Saitama (JP); Akira Hosono, Saitama (JP); Ryo Kobayashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 184 days.

(21) Appl. No.: 13/368,476

(22) Filed: Feb. 8, 2012

(65) Prior Publication Data

US 2012/0205179 A1 Aug. 16, 2012

(30) Foreign Application Priority Data

Feb. 14, 2011 (JP) ................... 2011-028461

(51) Int. Cl.
*B62D 61/02* (2006.01)
*B62K 11/02* (2006.01)
*B62K 19/00* (2006.01)

(52) U.S. Cl.
USPC ......... 180/219; 180/227; 280/274; 280/281.1

(58) Field of Classification Search
USPC ................ 180/219, 227, 220, 228, 229, 230; 280/274, 275, 281.1, 283, 284
See application file for complete search history.

(56) References Cited

U.S. PATENT DOCUMENTS

| | | | |
|---|---|---|---|
| 6,290,017 B1 * | 9/2001 | Ito ................................. | 180/219 |
| 6,695,089 B2 * | 2/2004 | Adachi et al. ................. | 180/311 |
| 7,111,701 B2 * | 9/2006 | Nagashii et al. .............. | 180/219 |
| 7,270,210 B2 * | 9/2007 | Katsura ......................... | 180/219 |
| 7,296,814 B2 * | 11/2007 | Miyamoto .................. | 280/281.1 |
| 7,490,689 B2 * | 2/2009 | Seki et al. ..................... | 180/229 |
| 7,537,077 B2 * | 5/2009 | Nakashima et al. .......... | 180/229 |
| 7,637,345 B2 * | 12/2009 | Kurokawa et al. ............ | 180/311 |
| 7,694,985 B2 | 4/2010 | Hoshi ........................... | 280/274 |
| 7,712,756 B2 * | 5/2010 | Seki et al. ..................... | 280/272 |
| 2002/0066611 A1 * | 6/2002 | Lane et al. .................... | 180/228 |
| 2007/0175691 A1 * | 8/2007 | Gogo et al. .................. | 180/227 |
| 2008/0223642 A1 * | 9/2008 | Shiraishi ....................... | 180/219 |
| 2011/0186373 A1 * | 8/2011 | Mori et al. .................... | 180/219 |

FOREIGN PATENT DOCUMENTS

JP 2006-205985 A 8/2006

* cited by examiner

*Primary Examiner* — Joseph M Rocca
*Assistant Examiner* — Marc A Scharich
(74) *Attorney, Agent, or Firm* — Carrier Blackman & Associates, P.C.; Joseph P. Carrier; William D. Blackman

(57) ABSTRACT

A vehicle body frame of a motorcycle includes a head pipe, a pair of main frame sections extending rearwardly from the head pipe, a pair of pivot plates joined to end portions of the main frame sections, and a crossmember arranged between the pivot plates. In such vehicle body frame, the crossmember is arranged between upper end portions of the pivot plates such that the upper end portions of the pivot plates are sandwiched between the crossmember and rear end portions of main frame sections so that at least a portion of the crossmember overlaps a joint portion between the main frame sections and the pivot plates as viewed in a side view. Such structure of the vehicle body frame ensures the rigidity of connecting portions where the crossmember is connected to pivot plates without making the vehicle body frame heavy and thick.

20 Claims, 5 Drawing Sheets

VEHICLE BODY FRAME FOR MOTORCYCLE, AND MOTORCYCLE INCORPORATING THE SAME

CROSS-REFERENCE TO RELATED APPLICATIONS

The present invention claims priority under 35 USC §119 based on Japanese patent application No. 2011-028461, filed on Feb. 14, 2011. The entire subject matter of this priority document, including specification claims and drawings thereof, is incorporated by reference herein.

BACKGROUND OF THE INVENTION

1. Field of the Invention

The present invention relates to a vehicle body frame for a motorcycle, and to a motorcycle incorporating the same. More particularly the present invention relates to a vehicle body frame for a motorcycle which includes: a head pipe which steerably supports a front fork which pivotally supports a front wheel and a steering handlebar; a pair of left and right main frame sections which extends rearwardly and downwardly from the head pipe; a pair of downwardly extending left and right pivot plates which is joined to rear end portions of the main frame sections from the inside in a vehicle widthwise direction; and a crossmember which is arranged between upper end portions of both pivot plates and having a damper mounting portion on which an upper end portion of a damper is mounted, and to a motorcycle incorporating the same.

2. Description of the Background Art

There is a known vehicle body frame for a motorcycle, particularly, a vehicle body frame for a motorcycle suitable for all terrain traveling. An example of such vehicle body frame for a motorcycle is disclosed in the Japanese Patent Document JP-A-2006-205985. In this type of vehicle body frame, rear end portions of main frame sections are joined to upper end portions of the pivot plates, and connecting portions which are formed on both ends of a crossmember are joined to joint portions between the pivot plates and the main frame sections from inside in a vehicle widthwise direction in a way similar to how a patch is fitted.

In the vehicle body frame as disclosed in the Japanese Patent Document JP-A-2006-205985, the joint portions of the main frame sections, the pivot plate and the crossmember exhibit poor resistance against a load input in a longitudinal direction as well as against a load input in a lateral direction, and the crossmember is arranged at a relatively upper position so that an input from a damper is also relatively large. Accordingly, it is necessary to make the connecting portions, which form patches on both end portions of the crossmember, large, heavy and thick.

The present invention has been made under such circumstances. Accordingly, it is one of the objects of the present invention to provide a vehicle body frame for a motorcycle which can ensure the rigidity of connecting portions where a crossmember is connected to pivot plates without making a frame member heavy and thick.

SUMMARY OF THE INVENTION

In order to achieve the above objects, the present invention according to a first aspect thereof is characterized in that in a vehicle body frame of a motorcycle which includes a head pipe which steerably supports a front fork which pivotally supports a front wheel and a steering handlebar, a pair of left and right main frame sections which extend rearwardly and downwardly from the head pipe, a pair of left and right pivot plates which are respectively joined to corresponding rear end portions of the main frame sections from the inside in the vehicle widthwise direction and extend downwardly, and a crossmember which is arranged between upper end portions of both pivot plates and having a damper mounting portion on which an upper end portion of a damper (shock absorber) is mounted; the crossmember is arranged between the upper end portions of both pivot plates such that the upper end portions of both pivot plates are sandwiched between the crossmember and rear end portions of the main frame sections in a state where at least a portion of the crossmember overlaps a joint portion between the respective main frame sections and pivot plates as viewed in a side view.

The present invention according to a second aspect thereof, in addition to the first aspect, is characterized in that the damper mounting portion, which is positioned above a line formed by an extension of an upper surface portion of the main frame sections as viewed in a side view, is integrally formed on a rear portion of the crossmember.

The present invention according to a third aspect thereof, in addition to one of the first and second aspects, is characterized in that the main frame sections and the pivot plates are joined to each other such that an angle therebetween is in an upwardly projecting direction.

The present invention according to a fourth aspect thereof, in addition to one of the first through third aspects, is characterized in that the vehicle body frame further includes a down frame section which extends rearwardly and downwardly from the head pipe at an angle steeper than an angle at which the main frame sections extend rearwardly and downwardly, and a reinforcing frame section which connects the main frame sections and the down frame section, and the reinforcing frame section is arranged between the main frame sections and the down frame section in a state where at least a portion of an area formed by an extension of the reinforcing frame section overlaps the crossmember as viewed in a side view.

The present invention according to a fifth aspect thereof, in addition to one of the first through fourth aspects, is characterized in that an engine is supported on the pivot plates by an engine hanger at a position below the crossmember as viewed in a side view.

The present invention according to a sixth aspect thereof, in addition to one of the first through fifth aspects, is characterized in that the vehicle body frame further comprises a connection projecting portion, a joining recessed portion, and a second thin-walled recessed portion; and that the connection projecting portion which projects inwardly in the vehicle widthwise direction and forms a first thin-walled recessed portion on a center portion thereof is integrally formed on an inner side of the upper end portion of the pivot plate in the vehicle widthwise direction in a state where an end portion of the crossmember is joined to the connection projecting portion, the joining recessed portion which allows a rear end portion of the main frame to be fitted therein and joined thereto is formed on an outer side of the upper end portion of the pivot plate in the vehicle widthwise direction in a state where at least a portion of the first thin-walled recessed portion overlaps the joining recessed portion as viewed in a side view, and the second thin-walled recessed portion which partially overlaps the first thin-walled recessed portion as viewed in a side view is formed in the joining recessed portion.

Here, an upper crossmember 13 of this embodiment corresponds to the crossmember of the present invention, and a third engine hanger 21 of this embodiment corresponds to the engine hanger of the present invention.

Advantageous Effects of the Invention

According to the first technical aspect of the present invention, the upper end portions of the pair of left and right pivot plates are joined to the rear end portions of the pair of left and right main frame sections from the inside in the vehicle widthwise direction, and the crossmember is arranged between the upper end portions of both pivot plates such that the upper end portions of both pivot plates are sandwiched between the crossmember and the rear end portions of the main frame sections in a state where at least the portion of the crossmember overlaps the joint portion between the main frame and the pivot plate as viewed in a side view.

Due to such constitution of the vehicle body frame, the main frame sections, the pivot plates and the crossmember are joined to each other in a state where the upper end portions of the pivot plates are sandwiched between the rear end portions of the main frame sections and the end portions of the crossmember. Hence, an input from a damper which is mounted on the damper mounting portion formed on the crossmember is transmitted to the pivot plates and the main frame sections from the crossmember in an efficiently dispersed manner whereby the rigidity of the joint portions where both end portions of the crossmember are joined to the pivot plates can be enhanced while preventing the frame members such as the pivot plates and the main frame sections from becoming heavy and thick.

Further, according to the second technical aspect of the present invention, the damper mounting portion is positioned above the a line formed by an extension of an upper surface portion of the main frame sections as viewed in a side view.

Due to such constitution, an input from the damper is converted into a moment in the damper mounting portion. Hence, a rotational force and a pushing force in the oblique frontward and upward direction acts on the crossmember whereby a force which acts on the main frame sections from the crossmember follows the longitudinal direction of the main frame sections thus ensuring the rigidity of the main frame sections without making the main frame sections heavy and thick.

According to the third technical aspect of the present invention, although a force acts on the main frame sections and the pivot plates in the direction that these frame sections are pushed downwardly due to a rotational force which acts on the crossmember, the main frame sections and the pivot plates are joined to each other while making an angle therebetween in the upwardly projecting direction. Hence, it is possible to impart the rigidity which resists such a force in the downwardly pushing direction to the joint portions between the main frame sections and the pivot plates.

According to the fourth technical aspect of the present invention, the reinforcing frame section is arranged between the down frame section which extends rearwardly and downwardly from the head pipe and the main frame sections in a state where at least a portion of the area formed by an extension of the reinforcing frame section overlaps the crossmember as viewed in a side view. Due to such constitution, the reinforcing frame section is arranged in the direction that the reinforcing frame section resists a force in the downwardly pushing direction which acts on the main frame sections and the pivot frame sections due to a rotational force which acts on the crossmember whereby the rigidity of the main frame sections and the pivot plates can be further enhanced.

According to the fifth technical aspect of the present invention, the engine is supported on the pivot plates by using the engine hanger at the position located below the crossmember as viewed in a side view. Due to such constitution, a pushing force in the upward direction which acts on the pivot plates from the damper can be offset by a weight (inertia) of the engine.

Further, according to the sixth technical feature of the present invention, at least a portion of the first thin-walled recessed portion which is formed on the center portion of the connection projecting portion which is integrally formed on an inner side of the upper end portion of the pivot plate in the vehicle widthwise direction overlaps the joining recessed portion which is formed on an outer side of the upper end portion of the pivot plate in the vehicle width wise direction and allows a rear end portion of the main frame to be fitted therein and joined thereto as viewed in a side view, and the second thin-walled recessed portion which partially overlaps the first thin-walled recessed portion as viewed in a side view is formed in the joining recessed portion.

Due to such constitution, it is possible to suppress the increase of weight which may be caused by integrally mounting the connection projecting portions for joining the crossmember on the upper end portions of the pivot plates.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

Figure 1:
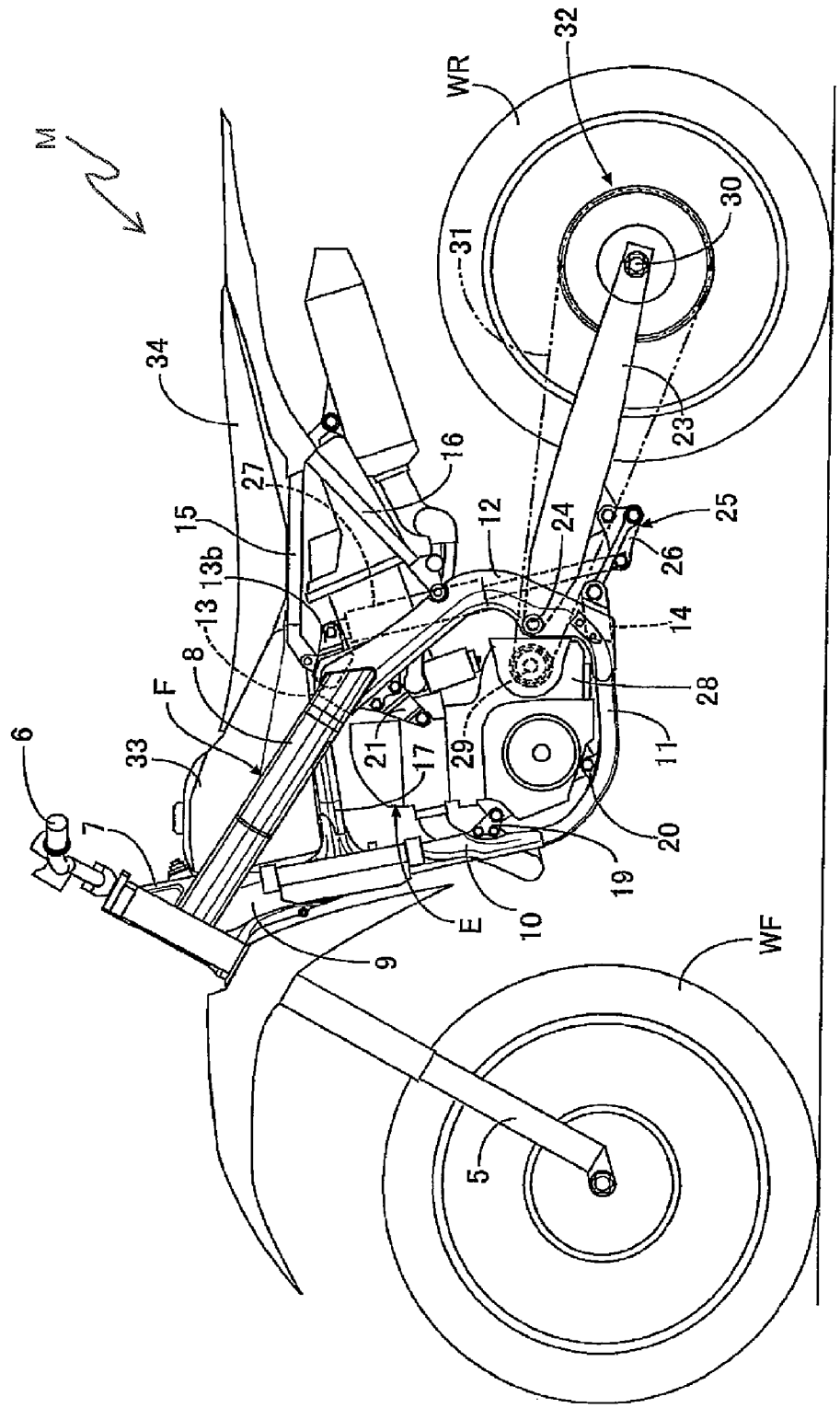
FIG. 1 is a side view of a motorcycle according to an illustrative embodiment of the present invention.

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention. In addition, it is noted that the symbol " . . . " following a reference number is intended to mean that more than one of the identified component is present in the described system.

An illustrative embodiment of the present invention is explained in conjunction with attached FIG. 1 to FIG. 5. Firstly, in FIG. 1 to FIG. 3, a motorcycle M according to this embodiment is a motorcycle for motocross competition.

A vehicle body frame F of the motorcycle M includes: a head pipe 7 which steerably supports a front fork 5 which pivotally supports a front wheel WF and a bar-shaped steering handlebar 6; a pair of left and right main frame sections 8 . . . each of which extends rearwardly and downwardly from the head pipe 7; a down frame section 9 which extends rearwardly and downwardly from the head pipe at an angle steeper than an angle at which the main frame sections 8 . . . extend rearwardly and downwardly; a pair of left and right lower frame sections 11 . . . which is contiguously formed on a lower end portion of the down frame section 9 by using a joint 10 and extends rearwardly; a pair of left and right pivot plates 12 . . . which has upper end portions thereof joined to rear end portions of the main frame sections 8 . . . , which extends downwardly, and has lower end portions on which rear end portions of both lower frame sections 11 . . . are contiguously formed; an upper crossmember 13 (also referred to as a crossmember 13) which is provided between the upper end portions of the pivot plates 12; a lower crossmember 14 which is provided between the lower end portions of both pivot plates 12 . . . ; a pair of left and right seat rails 15 . . . which has front end portions thereof connected to the upper crossmember 13 and extends rearwardly; a pair of left and right rear frame sections 16 . . . which connects intermediate portions of both pivot plates 12 . . . in the vertical direction and rear portions of both seat rails 15 . . .; and an approximately U-shaped reinforcing frame section 17 which connects a lower portion of the down frame section 9 and both main frame sections 8 . . . .

The pivot plates 12 . . . are formed in a vertically extending such that approximately intermediate portions of the pivot plates 12 . . . in the vertical direction are curved in a rearwardly projecting manner. Front portions of the rear frame sections 16 are connected to rear frame connection portions 18 . . . which are mounted on the intermediate portions of the pivot plates 12 . . . in the vertical direction.

An engine E is arranged in a space surrounded by the main frame sections 8 . . . , the down frame section 9, the joint 10 between the down frame section 9 and lower frame sections 11, the lower frame sections 11 . . . , and the pivot plates 12 . . . . A front portion of the engine E is supported on the joint 10 by using a first engine hanger 19, a lower portion of the engine E is supported on second engine hangers 20 . . . which are mounted on the lower frame sections 11 . . . , and an upper portion of the engine E is supported on upper portions of the pivot plates 12 . . . by using third engine hangers 21 . . . .

A front end portion of a swing arm 23 which pivotally supports a rear wheel WR on a rear end portion thereof is supported on lower portions of the pivot plates 12 . . . in a vertically swingable manner by via a support shaft 24. A link mechanism 25 is arranged between the lower crossmember 14 and the swing arm 23. A damper (shock absorber) 27 is arranged between a link member 26 which constitutes a part of the link mechanism 25 and the upper crossmember 13.

A transmission unit (not shown) is housed inside a crankcase 28 of the engine E. An output shaft 29 of the transmission projects leftwardly from the crankcase 28. A power transmission unit 32 which uses an endless chain 31 is arranged between the output shaft 29 of the transmission unit and an axle 30 of the rear wheel WR.

Further, a fuel tank 33 is mounted on both main frame sections 8 . . . above the engine E. A rider's seat 34 is arranged behind the fuel tank 33 such that the rider's seat 34 is supported on the seat rails 15 . . . .

Figure 4:
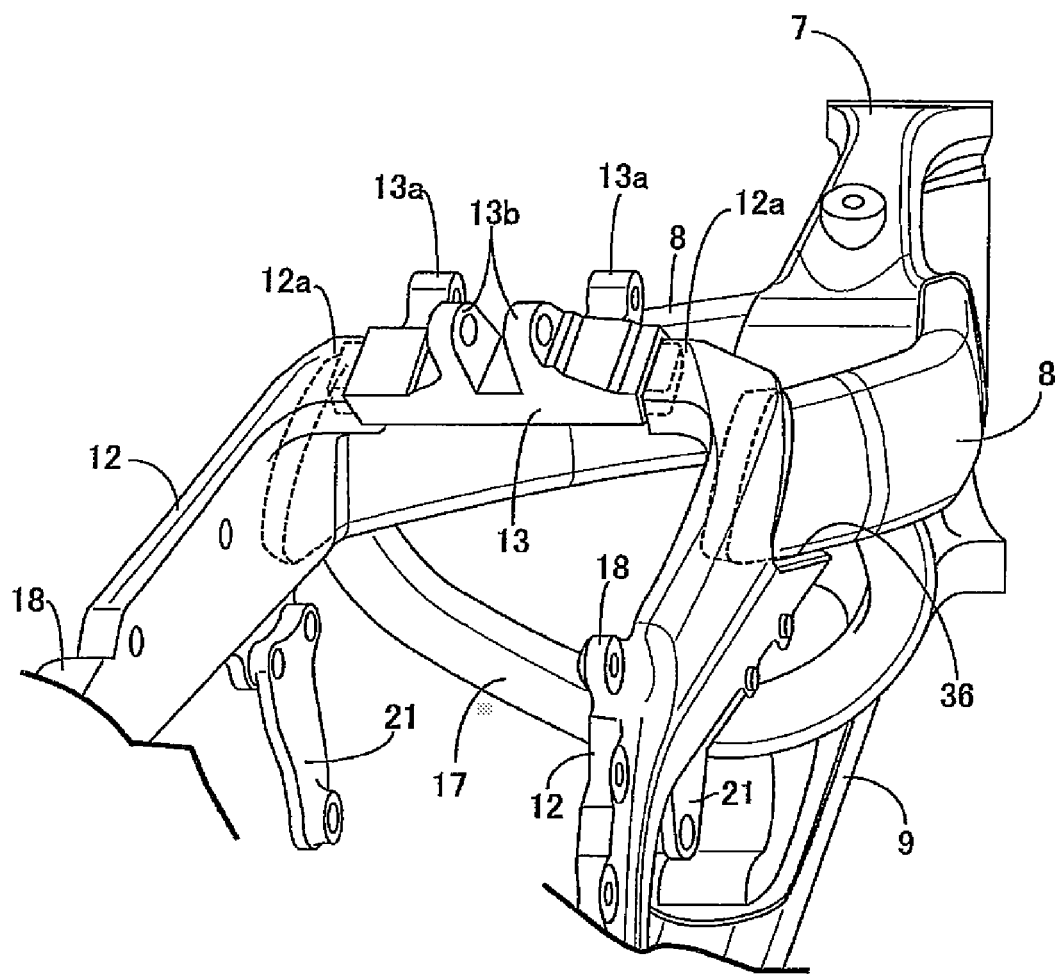
FIG. 4 is a perspective view showing a part of the vehicle body frame as viewed from an oblique upper posterior angle.
Figure 5:
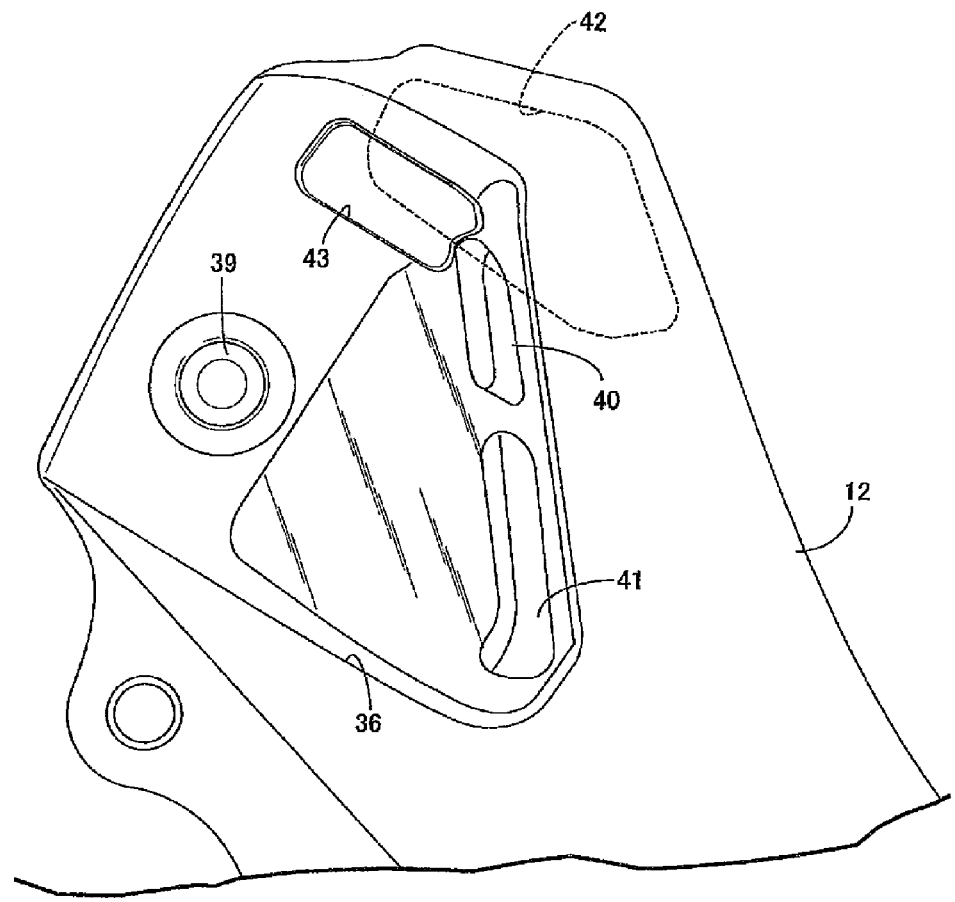
FIG. 5 is a side view of an upper end portion of a pivot plate as viewed from the outside in a vehicle widthwise direction.

Further, the illustrative embodiment of the present invention is discussed in conjunction with FIG. 4 and FIG. 5.

Upper end portions of the pair of left and right pivot plates 12 . . . are joined from inside, in the vehicle widthwise direction, to rear end portions of the pair of left and right main frame sections 8 . . . which forms a squarish eight shape in a transverse cross sectional shape. Rear end portions of the main frame sections 8 . . . are fitted into joining recessed portions 36 . . . . The joining recessed portions 36 . . . are formed on outer surfaces of the upper end portions of the pivot plates 12 . . . in the vehicle widthwise direction.

Projecting portions 39 . . . which are fitted into inner walls of the main frame sections 8 . . . , and projecting portions 40 . . . , 41 . . . which are fitted into rear end opening portions of the main frame sections 8 . . . having a squarish eight shape are formed in a projecting manner on the joining recessed portions 36 . . . . In a state where the rear end portions of the main frame sections 8 . . . are positioned and fitted into the joining recessed portions 36 . . . , the rear end portions of the main frame sections 8 . . . and the upper end portions of the pivot plates 12 . . . are joined to each other by welding. Further, the main frame sections 8 . . . and the pivot plates 12 . . . are joined to each other in such that the main frame sections 8 . . . and the pivot plates 12 . . . have an angle formed therebetween, such that a line bisecting the angle extends in an upwardly projecting direction.

Connection projecting portions 12a . . . which project inwardly in the vehicle widthwise direction are integrally formed on inner surfaces of the upper end portions of the pivot plates 12 . . . in the vehicle widthwise direction. First thin-walled recessed portions 42 . . . are formed on center portions of the connection projecting portions 12a . . . . Both end portions of the upper crossmember 13 are joined to the connection projecting portions 12a . . . of both pivot plates 12 . . . by welding. As seen in each of FIGS. 3 and 4, the vehicle body frame F is configured such that outermost lateral edges of the upper crossmember 13 are spaced inwardly away from inner surfaces of the main frame sections in a vehicle width direction.

Further, the upper crossmember 13 is arranged between the upper end portions of both pivot plates 12 . . . in such a manner that at least a portion of the upper crossmember 13 overlaps joint portions 37 . . . between the main frame sections 8 . . . and the pivot plates 12 . . . as viewed in a side view, and the upper end portions of the pivot plates 12 . . . are sandwiched between the upper crossmember 13 and the rear end portions of the main frame sections 8 . . . . In this embodiment, as shown in FIG. 2, the upper crossmember 13 is arranged such that a front portion of the upper crossmember 13 overlaps the joint portions 37 . . . as viewed in a side view.

Further, second thin-walled recessed portions 43 . . . are formed inside the joining recessed portions 36 . . . . The joining recessed portions 36 are formed on outer surfaces of the upper end portions of the pivot plates 12 . . . in the vehicle widthwise direction. The second thin-walled recessed portions 43 . . . are arranged at positions where the second thin-walled recessed portions 43 . . . partially overlap the first thin-walled recessed portions 42 . . . as viewed in a side view.

A pair of left and right seat rail mounting portions 13a, 13a is integrally formed on an upper portion of the upper crossmember 13 in an upwardly projecting manner. Front end portions of the seat rails 15 . . . are connected to the seat rail mounting portions 13a, 13a. Further, damper mounting portions 13b, 13b are integrally formed on a rear portion of the upper crossmember 13 in a rearwardly projecting manner. An upper end portion of the damper 27 is connected to the damper mounting portions 13b . . . .

Figure 2:
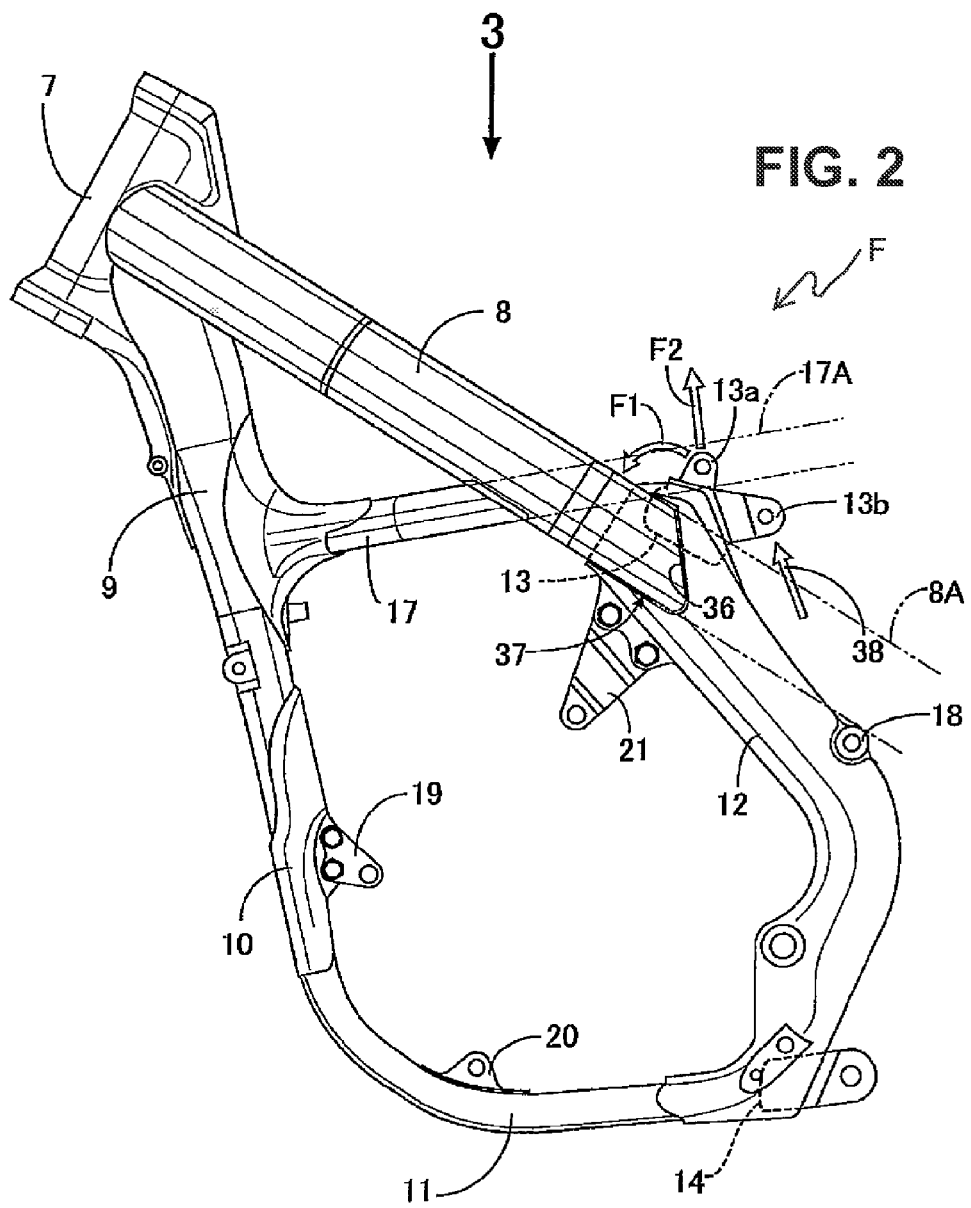
FIG. 2 is a side view showing a part of a vehicle body frame of the motorcycle.
Figure 3:
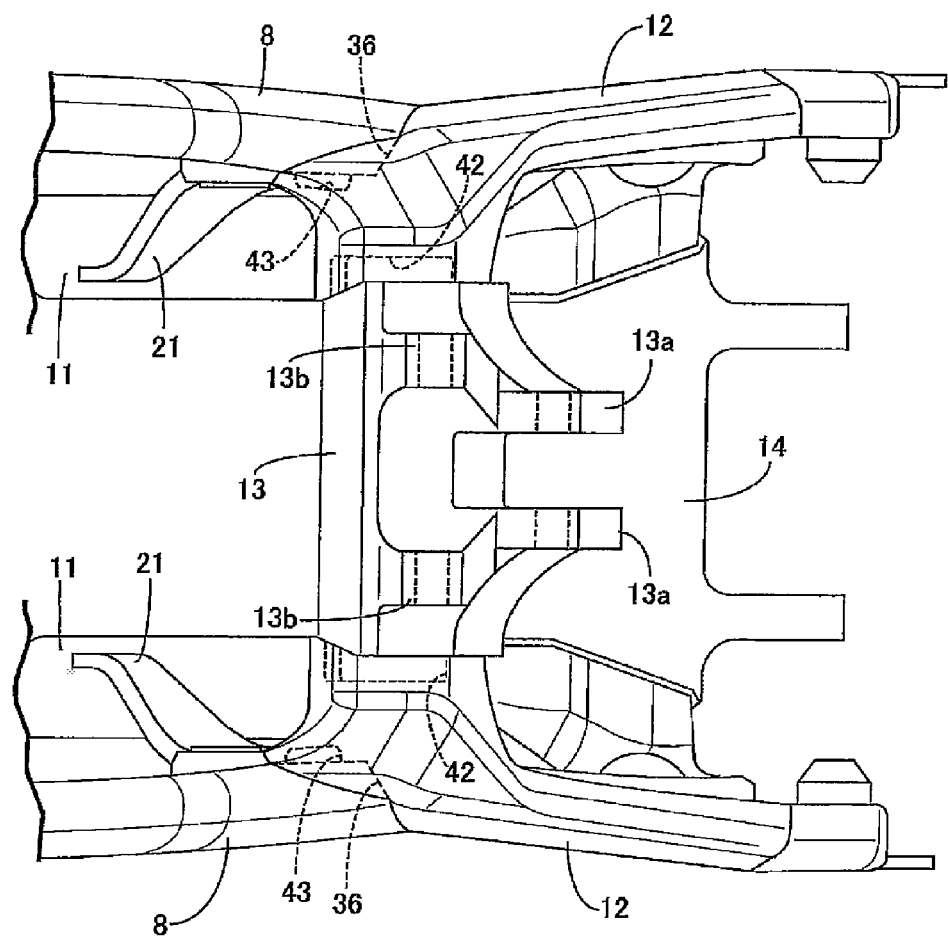
FIG. 3 is a view showing a part of the vehicle body frame as viewed in a direction indicated by an arrow 3 in FIG. 2.

Further, the damper mounting portions 13b . . . , as shown in FIG. 2, are integrally formed on the rear portion of the upper crossmember 13 in such that the damper mounting portions 13b are positioned above lines formed by extensions of upper surface portions 8A . . . of the main frame sections 8 . . . as viewed in a side view.

Further, the reinforcing frame section 17 which connects the main frame sections 8 . . . and the down frame section 9, as shown in FIG. 2, is arranged between the main frame sections 8 . . . and the down frame section 9 in such that at least a portion of an area formed by an extension 17A of the reinforcing frame section 17 overlaps the upper crossmember 13 as viewed in a side view.

Further, the upper portion of the engine E is supported on the pivot plates 12 . . . by using the third engine hangers 21 . . . . Mounting positions where the third engine hangers 21 . . . are mounted on the pivot plates 12 . . . are arranged below the upper crossmember 13 as viewed in a side view. In other words, the engine E is supported on the pivot plates 12 . . . by using the third engine hangers 21 . . . at the position below the upper crossmember 13 as viewed in a side view.

Next, the manner of operation and advantageous effects of the illustrative embodiment are discussed.

The upper end portions of the pair of left and right pivot plates 12 . . . are joined to the rear end portions of the pair of left and right main frame sections 8 . . . from the inside in the vehicle widthwise direction, and the upper crossmember 13 is arranged between the upper end portions of both pivot plates 12 . . . such that the upper end portions of the pivot plates 12 . . . are sandwiched between the upper crossmember 13 and the rear end portions of the main frame sections 8 . . . in such that at least the portions of the upper crossmember 13 overlap the joint portions 37 between the main frame sections 8 . . . and the pivot plates 12 . . . as viewed in a side view.

Due to such constitution, the main frame sections 8 . . . , the pivot plates 12 . . . and the upper crossmember 13 are joined to each other such that the upper end portions of the pivot plates 12 . . . are sandwiched between the rear end portions of the main frame sections 8 . . . and the end portions of the upper crossmember 13. Accordingly, an input indicated by an arrow 38 in FIG. 2 from the damper 27, which is mounted on the damper mounting portions 13b . . . formed on the upper crossmember 13, is transmitted to the pivot plates 12 . . . and the main frame sections 8 . . . from the upper crossmember 13 in an efficiently dispersed manner whereby the rigidity of the joint portions where both end portions of the upper crossmember 13 are joined to the pivot plates 12 . . . can be enhanced while preventing the frame members such as the pivot plates 12 . . . and the main frame sections 8 . . . from becoming heavy and thick.

Further, the damper mounting portions 13b . . . which are positioned above the lines formed by extensions of upper surface portions 8A . . . of the main frame sections 8, as viewed in a side view, are integrally formed on the rear portion of the upper crossmember 13. Accordingly, an input from the damper 27 is converted into a moment in the damper mounting portions 13b . . . thus generating a force which throws down the pivot plates 12 . . . frontwardly. Hence, a rotational force F1 and a component force F2 of an upward pushing force in the oblique frontward and upward direction act on the upper crossmember 13 whereby a moment which acts on the main frame sections 8 . . . from the upper crossmember 13 is generated in the longitudinal direction of the main frame sections 8 . . . thus securing the rigidity of the main frame sections 8 . . . without making the main frame sections 8 . . . heavy and thick.

Further, although a force acts on the main frame sections 8 . . . and the pivot plates 12 . . . in the direction that these frame sections and the plates are pushed downwardly due to a rotational force which acts on the upper crossmember 13, the main frame sections 8 . . . and the pivot plates 12 . . . are joined to each other while making an angle therebetween in the upwardly projecting direction. Hence, it is possible to impart the rigidity which resists such a force in the downwardly pushing direction to the joint portions between the main frame sections 8 . . . and the pivot plates 12 . . . .

Further, the vehicle body frame F includes the down frame section 9 which extends rearwardly and downwardly from the head pipe 7 at an angle steeper than an angle at which the main frame sections 8 . . . extends rearwardly and downwardly, and the reinforcing frame section 17 which connects the main frame sections 8 . . . and the down frame section 9, and the reinforcing frame section 17 is arranged between the main frame sections 8 . . . and the down frame section 9 such that at least a portion of the area formed by an extension 17A of the reinforcing frame section 17 overlaps the upper crossmember 13 as viewed in a side view.

Due to such constitution, the reinforcing frame section 17 arranged in the direction that the reinforcing frame section 17 resists a force in the downwardly pushing direction which acts on the main frame sections 8 . . . and the pivot frame sections 12 . . . due to a rotational force which acts on the upper crossmember 13 whereby the rigidity of the main frame sections 8 . . . and the pivot frame sections 12 . . . can be further enhanced.

Further, the engine E is supported on the pivot plates 12 . . . by using the third engine hangers 21 . . . at the position below the upper crossmember 13 as viewed in a side view. Due to such constitution, a pushing force in the upward direction which acts on the pivot plates 12 . . . from the damper 27 can be offset by a weight (inertia) of the engine.

Further, the joint recessed portions 36 . . . where at least a portion of the first thin-walled recessed portion 42 . . . which is formed on the center portion of the connection projecting portion 12a projecting inwardly in the vehicle widthwise direction from the upper end portions of the pivot plates 12 . . . so as to join the upper crossmember 13 to the pivot plates 12 . . . overlaps as viewed in a side view are formed on outer surfaces of the upper end portions of the pivot plates 12 . . . in the vehicle widthwise direction, and the second thin-walled recessed portions 43 . . . which partially overlap the first thin-walled recessed portions 42 . . . as viewed in a side view are formed in the joint recessed portions 36 . . . . Hence, it is possible to suppress the increase of weight which may be caused by integrally mounting the connection projecting portions 12a . . . for joining the upper crossmember 13 on the upper end portions of the pivot plates 12 . . . .

Although the embodiment of the present invention has been explained heretofore, the present invention is not limited to the above-mentioned embodiment and various modifications are conceivable without departing from the present invention described in claims. Those skilled in the art will realize that many modifications of the illustrative embodiment could be made which would be operable. All such modifications, which are within the scope of the claims, are intended to be within the scope and spirit of the present invention.

What is claimed is:

1. A vehicle body frame for a motorcycle, comprising:
a head pipe which steerably supports a front fork which pivotally supports a front wheel and a steering handlebar;
a pair of left and right main frame sections which extend rearwardly and downwardly from the head pipe;
a pair of left and right pivot plates which are respectively joined to left and right rear end portions of the main frame sections at joint portions where the respective pivot plates and rear end portions of the main frame sections overlap in a vehicle widthwise direction, the rear end portions of the main frame sections curving inwardly at the joint portions such that outer surfaces of the rear end portions of the main frame sections are disposed inwardly away from respective outer surfaces of the pivot plates in the vehicle widthwise direction, and said pivot plates extending rearwardly and downwardly from the main frame sections and having upper end portions which extend inwardly away from inner surfaces of the main frame sections in the vehicle widthwise direction; and a crossmember which interconnects the upper end portions of said pivot plates, said crossmember having a damper mounting portion on which an upper end portion of a damper is mounted;

wherein the vehicle body frame is configured such that outermost lateral ends of the crossmember, which are respectively joined with the upper end portions of the pivot plates, are spaced inwardly away from the inner surfaces of the main frame sections in the vehicle widthwise direction;

and wherein the upper end portions of the pivot plates are respectively disposed between the crossmember and the rear end portions of the main frame sections, and at least a portion of a cross-sectional area of each lateral end of the crossmember overlaps the respective joint portion where each respective main frame section and pivot plate overlap as viewed in a side view of the vehicle body frame.

2. The vehicle body frame for a motorcycle according to claim 1, wherein the damper mounting portion, which is positioned above lines extended rearwardly from upper surface portions of the main frame sections as viewed in a side view of the vehicle body frame, is integrally formed on a rear portion of the crossmember.

3. The vehicle body frame for a motorcycle according to claim 2, wherein the main frame sections and the pivot plates are joined to each other, at the respective joint portions, such that an angle is defined therebetween.

4. The vehicle body frame for a motorcycle according to claim 2, further comprising:
  a down frame section which extends rearwardly and downwardly from the head pipe at an angle steeper than an angle at which the main frame sections extend rearwardly and downwardly from the head pipe; and
  a reinforcing frame section which connects the main frame sections and the down frame section;
  wherein the reinforcing frame section is arranged between the main frame sections and the down frame section such that at least a portion of an area formed by extension lines, which extend rearwardly from upper and lower surfaces of the reinforcing frame section, overlaps the crossmember as viewed in a side view of the vehicle body frame.

5. The vehicle body frame for a motorcycle according to claim 2, further comprising an engine hanger respectively corresponding to each of the pivot plates and which is fixedly attached to and extends downwardly from the corresponding pivot plate, wherein an upper portion of an engine is supported on the pivot plates by the engine hangers at a position below the crossmember as viewed in a side view of the vehicle body frame.

6. The vehicle body frame for a motorcycle according to claim 2, further comprising:
  a connection projecting portion, which projects inwardly in the vehicle widthwise direction and forms a first thin-walled recessed portion on a center portion thereof, being integrally formed on an inner side of the upper end portion of each of the pivot plates in the vehicle widthwise direction such that each respective lateral end of the crossmember is joined to the respective connection projecting portion,
  a joining recessed portion, which allows a respective rear end portion of the main frame section to be received therein and joined thereto, is formed on an outer side of the upper end portion of each of the pivot plates in the vehicle widthwise direction such that at least a portion of a cross-sectional area of each first thin-walled recessed portion overlaps the joining recessed portion, at each respective joint portion, as viewed in a side view of the vehicle body frame, and
  a second thin-walled recessed portion, which partially overlaps the first thin-walled recessed portion as viewed in a side view of the vehicle body frame, is formed in the joining recessed portion.

7. The vehicle body frame for a motorcycle according to claim 1, wherein the main frame sections and the pivot plates are joined to each other, at the respective joint portions, such that an angle is defined therebetween.

8. The vehicle body frame for a motorcycle according to claim 7, further comprising:
  a down frame section which extends rearwardly and downwardly from the head pipe at an angle steeper than an angle at which the main frame sections extend rearwardly and downwardly from the head pipe; and
  a reinforcing frame section which connects the main frame sections and the down frame section;
  wherein the reinforcing frame section is arranged between the main frame sections and the down frame section such that at least a portion of an area formed by extension lines, which extend rearwardly from upper and lower surfaces of the reinforcing frame section, overlaps the crossmember as viewed in a side view of the vehicle body frame.

9. The vehicle body frame for a motorcycle according to claim 7, further comprising an engine hanger respectively corresponding to each of the pivot plates and which is fixedly attached to and extends downwardly from the corresponding pivot plate, wherein an upper portion of an engine is supported on the pivot plates by the engine hangers at a position below the crossmember as viewed in a side view of the vehicle body frame.

10. The vehicle body frame for a motorcycle according to claim 7, further comprising:
  a connection projecting portion, which projects inwardly in the vehicle widthwise direction and forms a first thin-walled recessed portion on a center portion thereof, being integrally formed on an inner side of the upper end portion of each of the pivot plates in the vehicle widthwise direction such that each respective lateral end of the crossmember is joined to the respective connection projecting portion,
  a joining recessed portion, which allows a respective rear end portion of the main frame section to be received therein and joined thereto, is formed on an outer side of the upper end portion of each of the pivot plates in the vehicle widthwise direction such that at least a portion of a cross-sectional area of each first thin-walled recessed portion overlaps the joining recessed portion, at each respective joint portion, as viewed in a side view of the vehicle body frame, and
  a second thin-walled recessed portion, which partially overlaps the first thin-walled recessed portion as viewed in a side view of the vehicle body frame, is formed in the joining recessed portion.

11. The vehicle body frame for a motorcycle according to claim 1, further comprising:
  a down frame section which extends rearwardly and downwardly from the head pipe at an angle steeper than an angle at which the main frame sections extend rearwardly and downwardly from the head pipe; and a reinforcing frame section which connects the main frame sections and the down frame section;

wherein the reinforcing frame section is arranged between the main frame sections and the down frame section such that at least a portion of an area formed by extension lines, which extend rearwardly from upper and lower surfaces of the reinforcing frame section, overlaps the crossmember as viewed in a side view of the vehicle body frame.

12. The vehicle body frame for a motorcycle according to claim 11, further comprising an engine hanger respectively corresponding to each of the pivot plates and which is fixedly attached to and extends downwardly from the corresponding pivot plate, wherein an upper portion of an engine is supported on the pivot plates by the engine hangers at a position below the crossmember as viewed in a side view of the vehicle body frame.

13. The vehicle body frame for a motorcycle according to claim 11, further comprising:
  a connection projecting portion, which projects inwardly in the vehicle widthwise direction and forms a first thin-walled recessed portion on a center portion thereof, being integrally formed on an inner side of the upper end portion of each of the pivot plates in the vehicle widthwise direction such that each respective lateral end of the crossmember is joined to the respective connection projecting portion,
  a joining recessed portion, which allows a respective rear end portion of the main frame section to be received therein and joined thereto, is formed on an outer side of the upper end portion of each of the pivot plates in the vehicle widthwise direction such that at least a portion of a cross-sectional area of each first thin-walled recessed portion overlaps the joining recessed portion, at each respective joint portion, as viewed in a side view of the vehicle body frame, and
  a second thin-walled recessed portion, which partially overlaps the first thin-walled recessed portion as viewed in a side view of the vehicle body frame, is formed in the joining recessed portion.

14. The vehicle body frame for a motorcycle according to claim 1, further comprising an engine hanger respectively corresponding to each of the pivot plates and which is fixedly attached to and extends downwardly from the corresponding pivot plate, wherein an upper portion of an engine is supported on the pivot plates by the engine hangers at a position below the crossmember as viewed in a side view of the vehicle body frame.

15. The vehicle body frame for a motorcycle according to claim 14, further comprising:
  a connection projecting portion, which projects inwardly in the vehicle widthwise direction and forms a first thin-walled recessed portion on a center portion thereof, being integrally formed on an inner side of the upper end portion of each of the pivot plates in the vehicle widthwise direction such that each respective lateral end of the crossmember is joined to the respective connection projecting portion,
  a joining recessed portion, which allows a respective rear end portion of the main frame section to be received therein and joined thereto, is formed on an outer side of the upper end portion of each of the pivot plates in the vehicle widthwise direction such that at least a portion of a cross-sectional area of each first thin-walled recessed portion overlaps the joining recessed portion, at each respective joint portion, as viewed in a side view of the vehicle body frame, and
  a second thin-walled recessed portion, which partially overlaps the first thin-walled recessed portion as viewed in a side view of the vehicle body frame, is formed in the joining recessed portion.

16. The vehicle body frame for a motorcycle according to claim 1, further comprising:
  a connection projecting portion, which projects inwardly in the vehicle widthwise direction and forms a first thin-walled recessed portion on a center portion thereof, being integrally formed on an inner side of the upper end portion of each of the pivot plates in the vehicle widthwise direction such that each respective lateral end of the crossmember is joined to the respective connection projecting portion,
  a joining recessed portion, which allows a respective rear end portion of the main frame sections to be received therein and joined thereto, is formed on an outer side of the upper end portion of each of the pivot plates in the vehicle widthwise direction such that at least a portion of a cross-sectional area of each first thin-walled recessed portion overlaps the joining recessed portion, at each respective joint portion, as viewed in a side view of the vehicle body frame, and
  a second thin-walled recessed portion, which partially overlaps the first thin-walled recessed portion as viewed in a side view of the vehicle body frame, is formed in the joining recessed portion.

17. A motorcycle, comprising:
  a head pipe;
  a pair of main frame sections which extend rearwardly and downwardly from the head pipe;
  a pair of pivot plates which are respectively joined to rear end portions of the main frame sections at joint portions where the respective pivot plates and rear end portions of the main frame sections overlap in a vehicle widthwise direction, the rear end portions of the main frame sections curving inwardly at the joint portions such that outer surfaces of the rear end portions of the main frame sections are disposed inwardly away from respective outer surfaces of the pivot plates in the vehicle widthwise direction, and said pivot plates extending rearwardly and downwardly from the main frame sections and having upper end portions which extend inwardly away from inner surfaces of the main frame sections in the vehicle widthwise direction; and
  a crossmember which interconnects the upper end portions of said pivot plates, the crossmember having an upper end portion of a damper mounted thereon;
  wherein outermost lateral ends of the crossmember, which are respectively joined with the upper end portions of the pivot plates, are spaced inwardly away from the inner surfaces of the main frame sections in the vehicle widthwise direction;
  and wherein the crossmember is arranged between the upper end portions of said pivot plates such that the upper end portions of the pivot plates are respectively disposed between the crossmember and the rear end portions of the main frame sections such that at least a portion of a cross-sectional area of each lateral end of the crossmember overlaps the respective joint portion where each respective main frame section and pivot plate overlap as viewed in a side view of the motorcycle.

18. The motorcycle according to claim 17, wherein said crossmember includes a damper mounting portion integrally formed on a rear portion thereof, the damper mounting portion having the upper end portion of the damper mounted thereon; wherein said damper mounting portion is arranged at a position located rearwardly of the main frame sections as viewed in a side view of the motorcycle.

19. A frame assembly for a motorcycle, comprising:
a head pipe;
a pair of main frame sections which extend rearwardly and downwardly from the head pipe;
a pair of pivot plates which are respectively joined to rear end portions of the main frame sections at joint portions where the respective pivot plates and rear end portions of the main frame sections overlap in a vehicle widthwise direction, the rear end portions of the main frame sections curving inwardly at the joint portions such that outer surfaces of the rear end portions of the main frame sections are disposed inwardly away from respective outer surfaces of the pivot plates in the vehicle widthwise direction, and said pivot plates extending rearwardly and downwardly from the main frame sections and having upper end portions which extend inwardly away from inner surfaces of the main frame sections in the vehicle widthwise direction;
a crossmember which interconnects the upper end portions of said pivot plates, said crossmember having a damper mounting portion formed thereon;
wherein the frame assembly is configured such that outermost lateral ends of the crossmember, which are respectively joined with the upper end portions of the pivot plates, are spaced inwardly away from the inner surfaces of the main frame sections in the vehicle widthwise direction;
wherein the crossmember is arranged between the upper end portions of said pivot plates such that the upper end portions of the pivot plates are respectively disposed between the crossmember and the rear end portions of the main frame sections such that at least a portion of a cross-sectional area of each lateral end of the crossmember overlaps the respective joint portion where each respective main frame section and pivot plate overlap as viewed in a side view of the frame assembly; and
wherein said damper mounting portion is arranged at a position located rearwardly of the main frame sections as viewed in a side view of the frame assembly.

20. The frame assembly for a motorcycle according to claim 19, further comprising:
a down frame section which extends rearwardly and downwardly from the head pipe at an angle steeper than an angle at which the main frame sections extend rearwardly and downwardly from the head pipe; and
a reinforcing frame section which connects the main frame sections and the down frame;
wherein the reinforcing frame section is arranged between the main frame sections and the down frame.

* * * * *